(12) United States Patent
Lockett et al.

(10) Patent No.: US 9,682,516 B2
(45) Date of Patent: *Jun. 20, 2017

(54) RESIN INFUSION OF COMPOSITE PARTS USING A PERFORATED CAUL SHEET

(71) Applicant: The Boeing Company, Chicago, IL (US)

(72) Inventors: Peter J. Lockett, Fairfield (AU); David Pook, Malvern E (AU); Andrew K. Glynn, Melborne (AU)

(73) Assignee: THE BOEING COMPANY, Chicago, IL (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/594,129

(22) Filed: Jan. 11, 2015

(65) Prior Publication Data

US 2015/0125565 A1    May 7, 2015

Related U.S. Application Data

(62) Division of application No. 12/944,089, filed on Nov. 11, 2010, now Pat. No. 8,940,213.

(51) Int. Cl.
| | | |
|---|---|---|
| *B29C 70/42* | (2006.01) | |
| *B29C 70/44* | (2006.01) | |
| *B29C 37/00* | (2006.01) | |
| *B29L 31/00* | (2006.01) | |
| *B29L 31/06* | (2006.01) | |

(52) U.S. Cl.
CPC .......... *B29C 70/42* (2013.01); *B29C 37/0085* (2013.01); *B29C 70/443* (2013.01); *B29L 2031/00* (2013.01); *B29L 2031/06* (2013.01)

(58) Field of Classification Search
CPC ..................................................... B29B 15/14
USPC ..................................................... 425/382 R
See application file for complete search history.

(56) References Cited

U.S. PATENT DOCUMENTS

| | | | |
|---|---|---|---|
| 2,709,973 | A | 6/1955 | Meyer et al. |
| 3,339,333 | A | 9/1967 | Kovalcik |
| 3,775,238 | A | 11/1973 | Lyman |
| 3,890,749 | A | 6/1975 | Gunther |
| 4,357,292 | A | 11/1982 | Myers |
| 4,606,961 | A | 8/1986 | Munsen et al. |
| 4,942,013 | A | 7/1990 | Palmer et al. |

(Continued)

FOREIGN PATENT DOCUMENTS

| | | |
|---|---|---|
| CN | 101772452 A | 7/2010 |
| EP | 2452808 A1 | 5/2012 |

(Continued)

OTHER PUBLICATIONS

Notice of Reasons for Rejection and English Translation, issued Aug. 4, 2015, regarding Japanese Patent Application No. 2013-550467, 5 pages.

(Continued)

*Primary Examiner* — Matthew Daniels
*Assistant Examiner* — Kimberly A Stewart
(74) *Attorney, Agent, or Firm* — Yee & Associates, P.C.

(57) ABSTRACT

Resin infused composite parts are fabricated using a caul sheet having perforations therein for optimizing the flow of resin through the parts and allowing a simplified tooling and consumable arrangement for complex parts while achieving a smooth, aerodynamic caul-side or bag-side finish.

9 Claims, 5 Drawing Sheets

(56) References Cited

U.S. PATENT DOCUMENTS

| | | | |
|---|---|---|---|
| 5,419,965 | A | 5/1995 | Hampson |
| 5,567,499 | A | 10/1996 | Cundiff et al. |
| 5,569,508 | A | 10/1996 | Cundiff |
| 5,601,852 | A | 2/1997 | Seemann |
| 5,771,680 | A | 6/1998 | Zahedi et al. |
| 5,851,336 | A | 12/1998 | Cundiff et al. |
| 5,928,767 | A | 7/1999 | Gebhardt et al. |
| 6,156,146 | A | 12/2000 | Cundiff |
| 6,319,447 | B1 | 11/2001 | Cundiff et al. |
| 6,415,496 | B1 | 7/2002 | Dominguez Casado et al. |
| 6,561,478 | B2 | 5/2003 | Cundiff et al. |
| 6,586,054 | B2 | 7/2003 | Walsh |
| 6,589,618 | B2 | 7/2003 | Cundiff et al. |
| 6,610,229 | B1 | 8/2003 | Morales et al. |
| 6,627,142 | B2 | 9/2003 | Slaughter et al. |
| 6,811,733 | B2 | 11/2004 | Nelson et al. |
| 6,840,750 | B2 | 1/2005 | Thrash et al. |
| 6,872,340 | B2 | 3/2005 | Cundiff et al. |
| 6,896,841 | B2 | 5/2005 | Velicki et al. |
| 7,074,474 | B2 | 7/2006 | Toi et al. |
| 7,080,805 | B2 | 7/2006 | Prichard et al. |
| 7,138,028 | B2 | 11/2006 | Burpo et al. |
| 7,334,782 | B2 | 2/2008 | Woods et al. |
| 7,413,695 | B2 | 8/2008 | Thrash et al. |
| 7,419,627 | B2 | 9/2008 | Sheu et al. |
| 7,510,757 | B2 | 3/2009 | Lee et al. |
| 7,633,040 | B2 | 12/2009 | Glain et al. |
| 7,682,682 | B2 | 3/2010 | Leon-Dufour et al. |
| 8,042,315 | B2 | 10/2011 | Ashton et al. |
| 8,042,767 | B2 | 10/2011 | Velicki et al. |
| 8,043,453 | B2 | 10/2011 | Sawicki et al. |
| 8,091,603 | B2 | 1/2012 | Pham et al. |
| 8,182,628 | B2 | 5/2012 | Biornstad et al. |
| 8,267,354 | B2 | 9/2012 | Kallinen et al. |
| 8,302,909 | B2 | 11/2012 | Cazeneuve et al. |
| 8,424,806 | B2 | 4/2013 | Outon Hernandez et al. |
| 8,628,717 | B2 | 1/2014 | Pook et al. |
| 8,636,252 | B2 | 1/2014 | Lockett et al. |
| 8,940,213 | B2 | 1/2015 | Pook et al. |
| 2003/0025231 | A1 | 2/2003 | Slaughter et al. |
| 2003/0025232 | A1 | 2/2003 | Slaughter et al. |
| 2004/0032062 | A1 | 2/2004 | Slaughter et al. |
| 2004/0219244 | A1 | 11/2004 | Filsinger et al. |
| 2005/0003145 | A1 | 1/2005 | Toi et al. |
| 2005/0031720 | A1 | 2/2005 | Lippert et al. |
| 2005/0073076 | A1 | 4/2005 | Woods et al. |
| 2005/0211846 | A1 | 9/2005 | Leon-Dufour et al. |
| 2006/0125155 | A1 | 6/2006 | Sekido et al. |
| 2007/0108665 | A1 | 5/2007 | Glain et al. |
| 2008/0246175 | A1 | 10/2008 | Biornstad et al. |
| 2009/0044914 | A1 | 2/2009 | Pham et al. |
| 2009/0057487 | A1 | 3/2009 | Velicki et al. |
| 2009/0200425 | A1 | 8/2009 | Kallinen et al. |
| 2010/0024958 | A1 | 2/2010 | Sawicki et al. |
| 2010/0108245 | A1 | 5/2010 | Nishiyama et al. |
| 2010/0170989 | A1 | 7/2010 | Gray |
| 2011/0311782 | A1 | 12/2011 | Richmond et al. |
| 2011/0315824 | A1 | 12/2011 | Pook et al. |
| 2012/0052247 | A1 | 3/2012 | Pook et al. |
| 2012/0119422 | A1 | 5/2012 | Lockett et al. |
| 2012/0234978 | A1 | 9/2012 | Hernando Navas et al. |
| 2013/0264751 | A1 | 10/2013 | Lockett et al. |
| 2015/0328846 | A1 | 11/2015 | Pook et al. |

FOREIGN PATENT DOCUMENTS

| | | | |
|---|---|---|---|
| JP | 2004-181627 | * | 7/2004 |
| JP | 2004181627 | A | 7/2004 |
| JP | 2007118598 | A | 5/2007 |
| JP | 2007176163 | A | 7/2007 |
| NL | 1001725 | C2 | 5/1997 |
| WO | WO2004011169 | A2 | 2/2004 |
| WO | WO2006096647 | A2 | 9/2006 |
| WO | WO2008114809 | A1 | 9/2008 |
| WO | WO2010060908 | A2 | 6/2010 |
| WO | WO2011003844 | A2 | 1/2011 |
| WO | WO2011162884 | A1 | 12/2011 |

OTHER PUBLICATIONS

Office Action, dated Nov. 6, 2015, regarding U.S. Appl. No. 14/141,433, 34 pages.

International Search Report, dated Sep. 26, 2011, regarding Application No. PCT/US2011/036191 (WO2011162884), 10 pages.

EP examination communication dated May 6, 2013 regarding application 11187924.3-1706, reference NAN/P119089EP00, applicant The Boeing Company, 5 pages.

European Search Report, dated Feb. 16, 2012, regarding Application No. EP11187924 (EP2452808), 8 pages.

International Search Report, dated May 3, 2012, regarding Application No. PCT/US2011/063658 (WO2012102789), 12 pages.

International Preliminary Report on Patentability, dated Jul. 30, 2013, regarding Application No. PCT/US2011/063658, 7 pages.

Byrd et al., "The estimate of the effect of z-pins on the strain release rate, fracture, and fatigue in a composite co-cured z-pinned double cantilever beam," Composites Structures, 2005, vol. 68, No. 1, pp. 53-63.

Campbell, "Cure Tooling," In: Manufacturing Processes for Advanced Composites, 2004. Elsevier Ltd., Oxford, pp. 128-129.

Han et al., "Resin film infusion of stitched stiffened composite panels," Composites Part A: Applied Science and Manufacturing, 2003, vol. 34, pp. 227-236.

Higgins et al., "Design and testing of the Minotaur advanced grid-stiffened fairing," Composite Structures, 2004, vol. 66, No. 1-4, pp. 339-349.

Key et al., "Progressive failure predictions for rib-stiffened panels based on multicontinuum technology," Composite Structures, 2004, vol. 65, No. 3-4, pp. 357-366.

Mouritz, "Review of z-pinned composite laminates," Composites Part A: Applied Science and Manufacturing, 2007, vol. 38, No. 12, pp. 2383-2397.

Sheppard et al., "Rib separation in postbuckling stiffened shear panels," Composite Structures, 1998, vol. 41, No. 3-4, pp. 339-352.

Stickler et al., "Investigation of mechanical behavior of transverse stitched T-joints with PR520 resin in flexure and tension," Composite Structures, 2001, vol. 52, No. 3-4, pp. 307-314.

Office Action, dated Aug. 16, 2012, regarding U.S. Appl. No. 12/944,089, 26 pages.

Final Office Action, dated Dec. 21, 2012, regarding U.S. Appl. No. 12/944,089, 24 pages.

Office Action, dated Jun. 4, 2014, regarding U.S. Appl. No. 12/944,089, 22 pages.

Notice of Allowance, dated Oct. 3, 2014, regarding U.S. Appl. No. 12/944,089, 9 pages.

Office Action, dated May 6, 2013, regarding U.S. Appl. No. 13/012,162, 28 pages.

Notice of Allowance, dated Sep. 20, 2013, regarding U.S. Appl. No. 13/012,162, 12 pages.

Notice of Reasons for Rejection and English Translation dated Apr. 15, 2015, regarding Japanese Patent Application No. 2011-238929, 5 pages.

State Intellectual Property Office of PRC Notification of First Office Action and English Translation, dated Mar. 6, 2015, regarding Application No. 201180065886.2, 15 pages.

State Intellectual Property Office of PRC Notification of First Office Action and English Translation, dated Apr. 3, 2015, regarding Application No. 201110349327.6, 23 pages.

Notice of Allowance, dated May 17, 2016, regarding U.S. Appl. No. 14/141,433, 7 pages.

Office Action, dated Aug. 30, 2016, regarding U.S. Appl. No. 13/905,630, 39 pages.

Notice of Allowance, dated Jan. 17, 2017, regarding U.S. Appl. No. 13/905,630, 8 pages.

Notice of Reasons for Rejection and English Translation, dated Mar. 14, 2017, Regarding Application No. 2016-073950, 9 pages.

* cited by examiner

RESIN INFUSION OF COMPOSITE PARTS USING A PERFORATED CAUL SHEET

This Application is a divisional of U.S. patent application Ser. No. 12/944,089, filed Nov. 11, 2010, status allowed, now U.S. Pat. No. 8,940,213, the contacts of which application is incorporated herein by reference in its entirety.

CROSS REFERENCE TO RELATED APPLICATIONS

This application is related to U.S. patent application Ser. No. 12/823,414 filed Jun. 25, 2010 now U.S. Pat. No. 8,628,717, the entire disclosure of which is incorporated by reference herein.

TECHNICAL FIELD

This disclosure generally relates to fabrication of composite structures, especially using resin infusion techniques, and deals more particularly with a perforated caul sheet for optimizing the flow of resin through a fiber component.

BACKGROUND

One technique for fabricating composite parts involves infusing a dry fiber component with resin using a process referred to as resin infusion. In one variation of this process, referred to as vacuum assisted resin infusion, after the fiber component is vacuum bagged on a tool, a vacuum is drawn which both compacts the fiber component and draws resin through the component to produce a compacted, resin infused part.

The resin infusion process may present several problems in some applications. One of these problems involves the need to use a peel ply which may have a tendency to restrict the flow of resin from the resin source into the component being infused. Another problem relates to difficulties in tailoring the resin flow across the area of the component due to the fact that resin distribution media tend to distribute the resin uniformly across the area of the fiber component. This uniformity of resin flow may result in "trap-off" of certain areas of the component, sometimes referred to as "resin starvation", caused by resin-infused areas isolating adjacent dry areas from active vacuum paths. Another problem involves the need for locating resin supply components, such as channels, tubing and runners off of the fiber component so that they do not leave any mark-off on the infused part. Locating these resin supply components off of the fiber component may limit resin supply, may increase infusion distances and may increase infusion time while restricting optimization of the resin supply for a particular component.

Still another problem with existing resin infusion processes results from the need for placing a flexible peel ply and a flexible resin distribution media in contact with the fiber component. This direct contact may result in a relatively rough surface finish on the part, commonly known as the bag side finish, which may be unacceptable in applications where a smooth surface finish is required, such as in aircraft applications requiring an aerodynamic surface finish.

Another problem arises in connection with infusion of integrated components comprising multiple parts. In the case of integrated components, prior infusion techniques that used simple tooling required a complex bagging and/or consumable arrangement, while those that used a simple bagging/consumable arrangement required complex tooling.

Accordingly, there is a need for a method and apparatus for resin infusion which may eliminate the need for a peel ply while allowing optimization of the resin supply across the area of the fiber component, hence controlling the quantity of resin supplied to particular regions on the component. There is also a need for resin infusion apparatus that increases tooling flexibility by locating resin supply hardware directly on top of the component being infused without causing part mark-off while providing a smooth cured part finish.

SUMMARY

The disclosed embodiments provide a method and apparatus for resin infusion which enables precise, tailored resin supply to a fiber component, resulting in reduced infusion times while simultaneously providing a smooth, aerodynamic surface finish on the bag side of the component and enabling simplified tooling for complex components. The reliability of successful infusion of parts may be improved, which may reduce scrap rework and repair. The method and apparatus simplify layup of consumables, which may reduce fabrication and labor cost. By providing infusion media with tailored permeability in different zones of the fiber component, the disclosed embodiments may allow a wider range of components to be resin infused, while reducing the complexity of internal tooling and potential wrinkling consumables. The embodiments may also allow more favorable tooling arrangements while achieving a relatively smooth, OML surface finish on the side of the fiber component from which resin is infused. The embodiments provide additional advantages in the case of resin infusion of complex parts such as those having integrated components. Integrated components may be resin infused using both simple tooling and simple arrangements of bagging and consumables, while achieving a smooth aerodynamic caul-side or bag-side finish.

According to one embodiment, apparatus is provided for fabricating resin infused composite parts comprising a caul sheet having perforations therein for controlling the flow of resin through a fiber component. The perforations may have a tapered cross section, and may be non-uniformly located over the area of the caul sheet.

According to another embodiment, a method is provided of fabricating resin infused composite parts. The method comprises placing a fiber component on the tool, placing a perforated caul sheet over the component, and infusing the component with resin through perforations in the caul sheet. The method may further include controlling the infusion of the component by controlling the distribution of the perforations, the density of the perforations or the size of the perforations. The method further includes flowing resin onto the caul sheet at a generally central location on the caul sheet.

According to a further embodiment, a method is provided of fabricating resin infused composite parts comprising placing a perforated caul sheet over a fiber component, and then infusing the fiber component with resin. The infusion may include controlling the flow of resin into the component using the caul sheet.

BRIEF DESCRIPTION OF THE ILLUSTRATIONS

DETAILED DESCRIPTION

Figure 1:
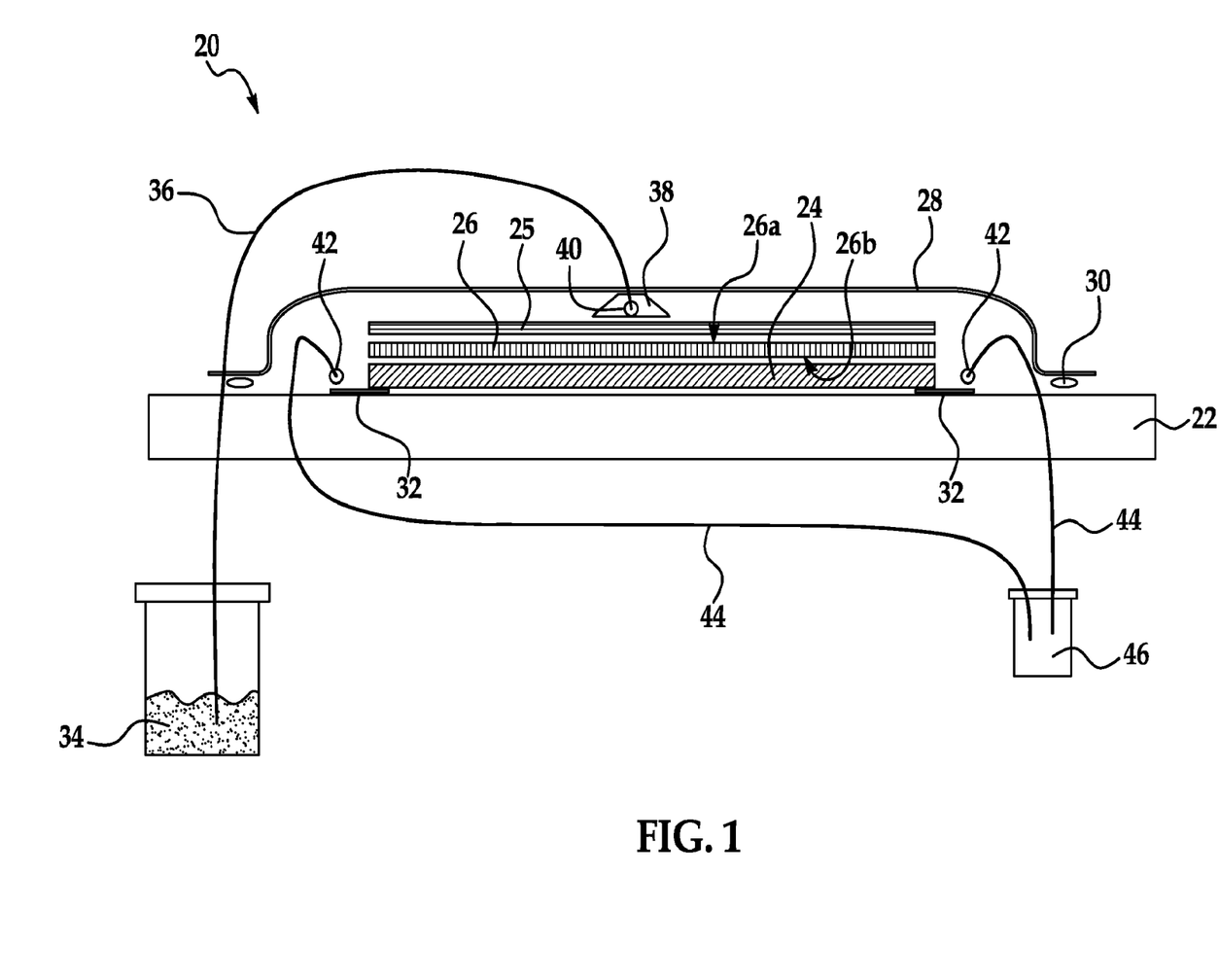
FIG. 1 is an illustration of a sectional view of apparatus for resin infusion of a fiber component.

Referring to FIG. 1, resin infusion apparatus 20 broadly comprises a tool 22, a fiber component 24 covered by a perforated caul sheet 26, resin distribution media 25, a vacuum bag 28 and a source of resin 34. As used herein, "component" and "fiber component" refer to a dry fiber or partially impregnated fiber component (also known as a "preform") that is to be infused with resin using a resin infusion process. The fiber component 24 may or may not have a shape that is preformed. Outlet consumables 32 are positioned between the tool 22 and the fiber component 24, and the caul sheet 26 rests directly on top of the component 24. The bag 28, which covers the component 24, the caul sheet 26 and the resin distribution media 25, is sealed to the tool 22 by means of a peripheral seal 30.

The source of resin 34 is coupled by a resin supply line 36 to an inlet port 38 which is generally centrally located over the caul sheet 26, inside the bag 28. Resin from the source 34 is introduced into the bag 28 through the inlet port 38 and flows through an inlet channel 40 and the distribution media 25 across and out over the caul sheet 26. Excess resin is removed from the bag 28 through outlet channels 42, outlet consumables 32 and an outlet (not shown in FIG. 1) where it is drawn through outlet lines 44 to an outlet vacuum reservoir 46. The central location of the inlet port 38 and inlet channel on the caul sheet 26 may assist in controlling the initial distribution of the resin 34 and formation of the wavefront 76 (FIG. 8) of the resin 34 as it flows over the caul sheet 26. The ability to control the initial distribution of the resin 34 over the component 24, and the tailored infusion of the component 24 made possible by the perforated caul sheet 26, may reduce variations in the fiber volume fraction of the cured part, thus improving part quality.

The inlet port 38 and inlet channel 40 rest directly on top of the distribution media 25 and the caul sheet 26. In other embodiments, the inlet port 38 and inlet channel 40 may be located at other positions on top of the caul sheet 26. In still other embodiments, one or more manifolds (not shown) may be coupled with the inlet port 38 to distribute resin to different locations on the caul sheet 26. The relative stiffness of the perforated caul sheet 26 allows the placement of the resin supply hardware, i.e. inlet port 38 and inlet channel 40, directly over the component 24 without causing any substantial part mark-off. Generally, locating the inlet port 38 and the inlet channel 40 centrally over the caul sheet 26 may result in minimum infusion times. The perforated caul sheet 26 may eliminate the need for use of a flow restricting peel ply (not shown) and may optimize the resin supply to the component through variation and perforation density, and hence the ability to vary the quantity of resin supplied to particular regions of the component 24. In some applications however, in order to achieve a desired surface finish on the infused component 24, a peel ply (not shown) may be placed between the caul sheet 26 and the component 24.

Figure 2:
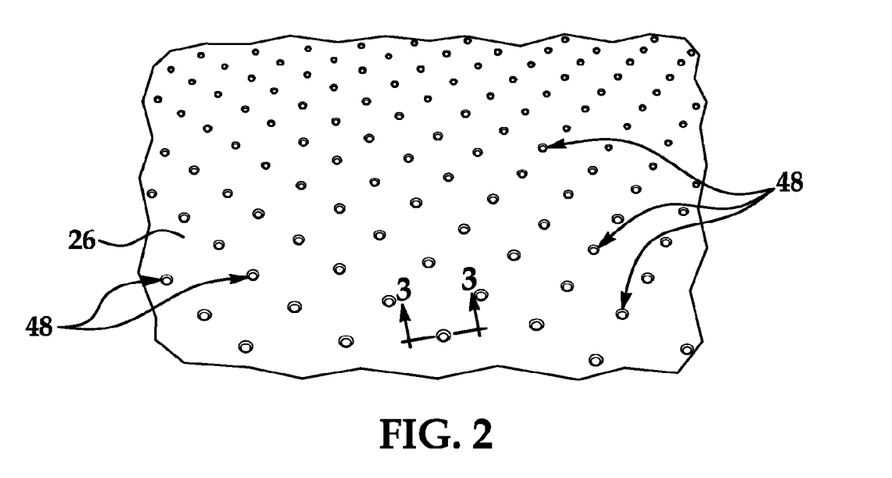
FIG. 2 is an illustration of an isometric view of a portion of the caul sheet used in the apparatus shown in FIG. 1.

Referring now to both FIGS. 1 and 2, the caul sheet 26 may be formed of any relatively rigid sheet material such as, without limitation, stainless steel or aluminum, having a surface finish suited to the application. Where it is desired to achieve a relatively smooth surface finish on the infused component 24, the caul sheet 26 should also have a relatively smooth surface finish since that finish will be substantially imparted to the component 24. In one typical application, the caul sheet 26 may have a thickness of approximately 0.8 to 2 mm, but may have any other thickness that is suitable for the particular application and manufacturing requirements. In some applications, for reasons discussed below, it may be desirable to select a material for the caul sheet 26 having a coefficient of thermal expansion (CTE) that is substantially different than that of the composite.

The caul sheet 26 may be formed into any shape, including flat and contoured shapes that match the final part shape and may have the ability to deform and thereby conform to the shape of the tool 22, including deforming under vacuum during processing. The caul sheet 26 has a multiplicity of perforations 48 therein through which resin may flow from the top 26a of the caul sheet 26 where it is distributed by the media 25, into the component 24 which is in face-to-face contact with the bottom 26b of the caul sheet 26. The number, size, density, location and distribution of perforations 48 in the caul sheet 26 may vary, depending upon the configuration, geometry and thickness variations of the component 24. In one practical embodiment providing satisfactory results, for example and without limitation, the perforations 48 may have a diameter of between approximately 1.5 and 2.5 mm, spaced apart approximately 15 to 25 mm. In another practical embodiment providing satisfactory results, the perforations 48 may have a diameter of approximately 0.5 mm and may be spaced approximately 4 mm from each other.

As will be discussed below in more detail, the pattern, and distribution of the perforations 48 in the caul sheet 26 may vary from relatively dense to relatively sparse in order to suit the resin supply requirements of the underlying component 24. In fact, some areas (not shown) of the caul sheet 26 may be free of perforation 48 and thus impermeable where the underlying component 24 does not require an active resin supply from above. The number and diameter of the perforations 48 may also depend at least in part on the viscosity of the resin.

Figure 3:
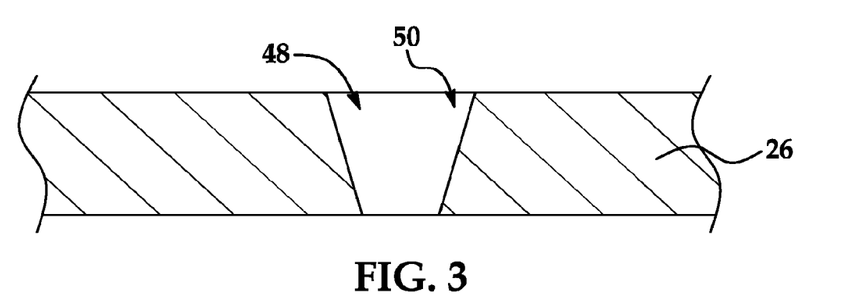
FIG. 3 is an illustration of a sectional view taken along the line 3-3 in FIG. 2.
Figure 4:
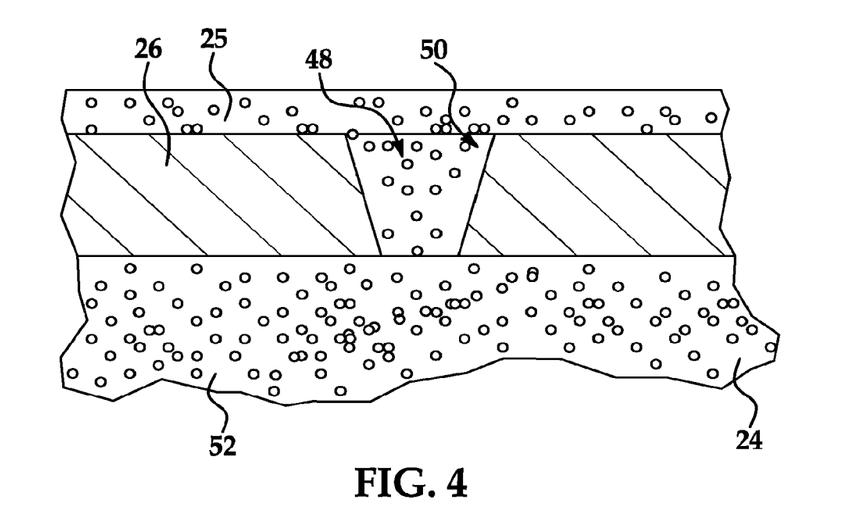
FIG. 4 is an illustration similar to FIG. 3 but showing resin having been infused into the component, wherein resin remains in the caul sheet perforations.
Figure 5:
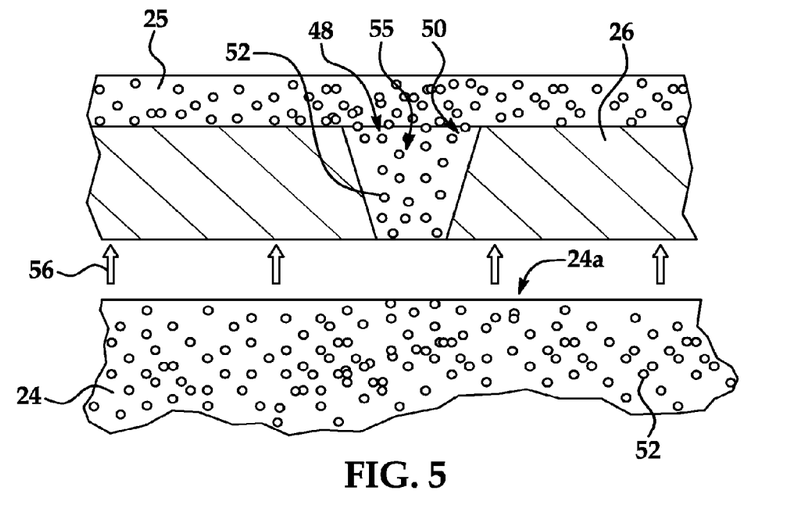
FIG. 5 is an illustration similar to FIG. 4 but showing the caul sheet having been separated from the infused component.

Referring to FIG. 3, the perforations 48 may have a taper 50 which may extend partially or completely through the caul sheet 26. FIG. 4 shows resin 52 having filled the distribution media 25 on top of the caul sheet 26 and passed through fully tapered perforations 48, leaving the perforations 48 filled with resin 52 following the infusion process and curing. Referring to FIG. 5, following curing of the resin 52, the caul sheet 26 may be separated away from the cured component 24, as shown by the arrows 56, resulting in a cured resin plug 55 being left in the perforations 52. Because of the tapering 50, the plugs 55 may be removed from the caul sheet 26 when the resin distribution media 25 is peeled away from the top of the caul sheet 26. In the illustrated embodiment, wherein the taper 50 extends through the entire depth of the perforations 48, the plugs 52 may break away cleanly from the surface 24a of the component 24, and leave a substantially smooth surface 24a that is substantially free of marks. In applications where the CTE of the caul sheet is substantially different than that of the composite 52, shrinkage of the caul sheet 26 during cool-down following curing may result in shearing of the resin plugs from the underlying cured component 24, thereby facilitating separation of the caul sheet 26 from the cured component 24.

Figure 6:
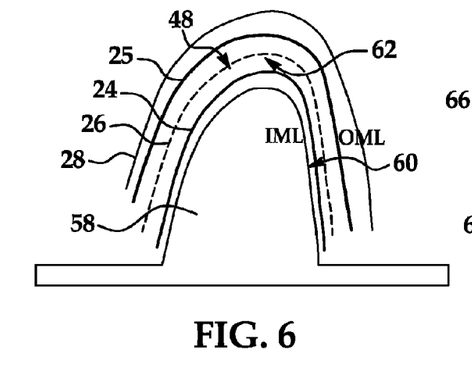
FIG. 6 is an illustration of a layup assembly for resin infusion in which the parts are partially exploded for clarity.

Attention is now directed to FIG. 6 which illustrates another tooling arrangement in which a curved caul sheet 26 is used in combination with an IML (inner mold line) tool 58 having an IML tool surface 60. In this example, the component 24 is placed between the caul sheet and the IML tool surface 60. Resin infusion inlets/outlets and associated channels are not shown in FIG. 6. for simplicity of description. Resin distribution media 25 and a vacuum bag 28 are placed over the caul sheet 26. Although not shown in the Figure, the bag 28 is sealed (not shown) around its perimeter to the tool 58. In this example, resin introduced into the bag 28 is distributed across the caul sheet 26 by the distribution media 25 and passes through the perforations 48 in the caul sheet 26, infusing the fiber component 24. The bag 28 compacts the component 24 between the IML tool surface 60 and the OML tool surface 62 defined by the caul sheet 26. This arrangement results in a finished part having substantially smooth IML and OML surface finishes, while avoiding the need for consumables between the tool 58 and the component 24, as well as the need for complex female tooling. The relatively smooth IML and OML surface finishes that remain on the part may reduce or eliminate the need for further surface finishing operations following part curing.

Figure 7:
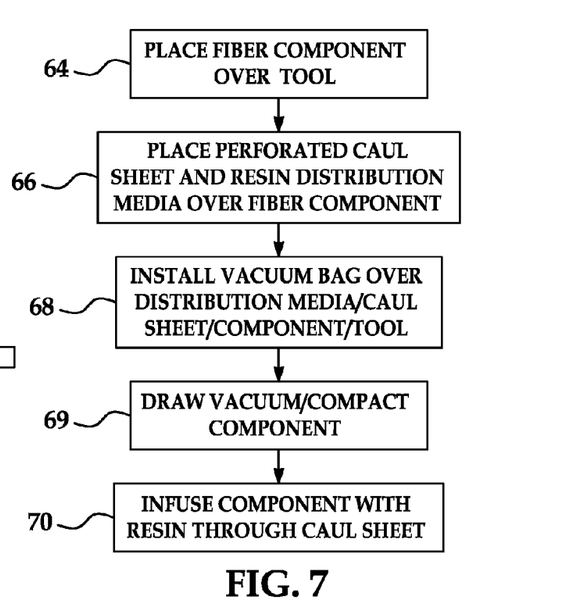
FIG. 7 is an illustration of a flow diagram of a method for resin infusion using the layup assembly shown in FIG. 6.

FIG. 7 illustrates the steps of a method of resin infusion using the previously described perforated caul sheet 26. Beginning at 64, a fiber component 24 is placed over a tool 58, such as that shown in FIG. 6. Next at 66, a perforated caul sheet 26 and resin distribution media 25 are placed over the fiber component 24. Vacuum bag 28 is then placed over the media 25, the caul sheet 26 and the tool 58. At 69, a vacuum is drawn in the bag 28, which compacts and consolidates the component 24. Finally, at step 70, the dry component 24 is infused with resin through the perforated caul sheet 26.

Figure 8:
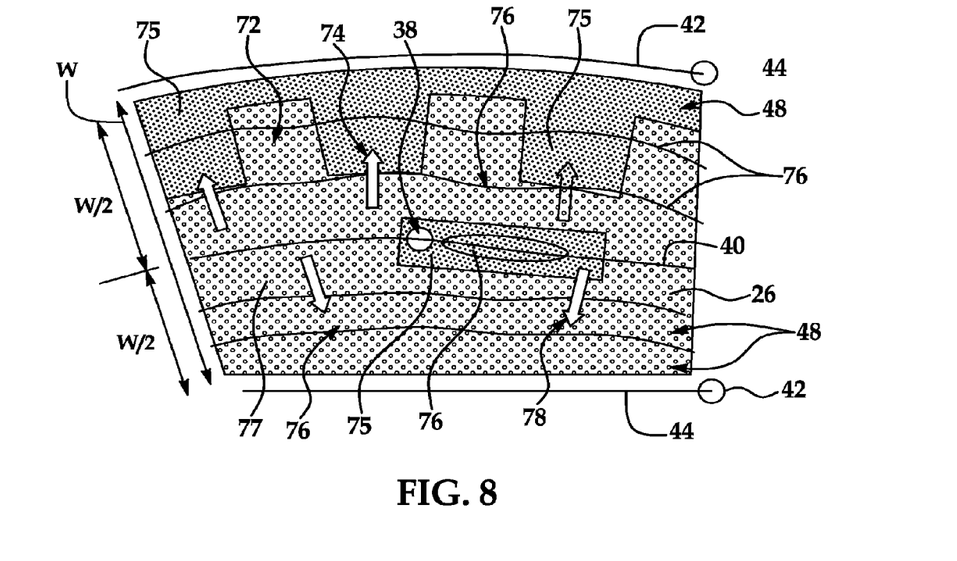
FIG. 8 is an illustration of a plan view of a portion of the resin infusion apparatus showing a caul sheet having differing perforation densities to achieve tailored resin infusion.

Attention is now directed to FIG. 8 which illustrates a perforated caul sheet 26 in which the relative permeability of the caul sheet 26 is different in certain areas of the caul sheet 26. This difference in permeability may be achieved by altering the size of the perforations 48 and/or the density of the perforations 48. In the example shown in FIG. 8, patterned areas 75 of the caul sheet 26 have a perforation density that is higher than that of other areas 77 of the caul sheet 26. This variation in density results in a variation of the permeability of the caul sheet 26, allowing better control of the infusion pattern of the resin supplied to the underlying dry component 24 (not shown in FIG. 8) through the caul sheet 26. Although not shown in the Figures, the caul sheet 26 may have areas that do not contain any perforations where the component 24 does not require an active resin supply.

FIG. 8 also illustrates the inlet port 38 and the inlet channel 40 located on top of and approximately half way across the width "W" of the caul sheet 26. This central positioning of the inlet port 38 and inlet channel 40 essentially halves the distance "W" that the resin must travel (W/2) in order to infuse the component 24, thus reducing resin infusion times compared to an arrangement where resin is fed from the side of the component 24. Although a single straight, centrally located inlet channel is shown in the illustrated embodiment, multiple channels forming a manifold (not shown) may be used to distribute the resin, as previously mentioned.

Resin flows through inlet port 38 and along inlet channel 40, which results in the outward flow of resin through the resin distribution media 25 (not shown in FIG. 8) indicated by arrows 74, across the caul sheet 26. Wavefront contours representing lines of substantially even resin flow are shown at 76. The resin flow wavefronts 76 are controlled by the caul sheet 26. In the illustrated example, areas 75 of the caul sheet 26 having a higher density of perforations 48 overlie thicker portions (not shown) of the underlying component 24, while the areas 77 of the caul sheet 26 having a lower density of perforation overlie thinner portions (not shown) of the underlying component 24. The areas 75 having a higher density of perforations 48 result in additional resin being supplied to the corresponding portions of the underlying component 24. As a result, thick and thin areas of the component 24 may infuse at a substantially even rate, and the substantially even wavefronts 74 of resin flow may result in avoiding trapped-off areas.

The use of a caul sheet 26 having variable permeability over its area may be utilized to better control the infusion pattern and resin supply to the component 24 to achieve selectively variable but robust resin impregnation of the component 24. By varying the caul sheet permeability, a greater resin supply can be utilized in areas where it is required, for example in a thick area of the component 24 (underlying perforated areas 75), sometimes referred to as a ply pad-up, and a lesser supply is provided to thinner areas of the same component, such as those underlying perforated areas 77. The diameter of the perforations 48 in the caul sheet 26 may be varied in order to control the rate of resin infusion into the component 24. The variable permeability of the caul sheet 26 assists in achieving the desired infusion pattern, and may avoid undesirable flow characteristics such as trapped-off areas, voids and/or resin starved regions. Such infusion patterns may be optimized through infusion process modeling of the caul sheet 26, including the perforation pattern, and associated component layup.

Figure 9:
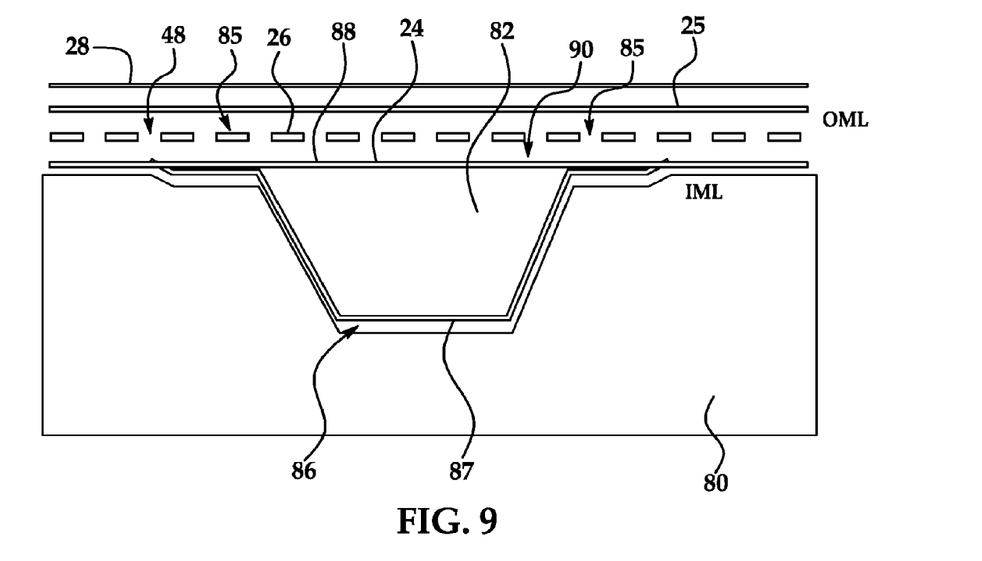
FIG. 9 is an illustration of a tooling and layup arrangement for resin infusion of integrated components.

FIG. 9 illustrates the use of a perforated caul sheet 26 as part of the tooling used to resin infuse a two piece integrated component 24 which in this example, comprises a hat-shaped stringer 88. The component 24 is placed in a cavity 86 in an IML tool 80, and a mandrel 82 is placed inside a hat-shaped component 24. The caul sheet 26 is placed over the base 90 of the stringer 88, and the bag 28 is placed over resin distribution media 25 and the caul sheet 26. The caul sheet 26 acts as an OML tool which imparts a substantially smooth OML surface finish to the stringer 88. This tooling arrangement avoids the need for infusion consumables to conform to internal tool structures and results in a smooth OML tool surface 90 on the base 90. The caul sheet 26 may includes a higher density and/or larger diameter perforations 48 in the area 85 overlying the hat section 87 to ensure that adequate resin is infused down into the hat section 87 of the component 24 within the cavity 86. Adequate resin infusion of the hat section 87 may also be achieved by introducing resin into the end (not shown) of the cavity 86, thereby infusing the hat section longitudinally in additional to the resin infusion achieved through the caul plate 26. The above arrangement is particularly advantageous in that it allows the use of simple tooling and simple arrangements of bagging and consumables, while resulting in parts having a smooth aerodynamic caul-side or bag-side finish.

Figure 10:
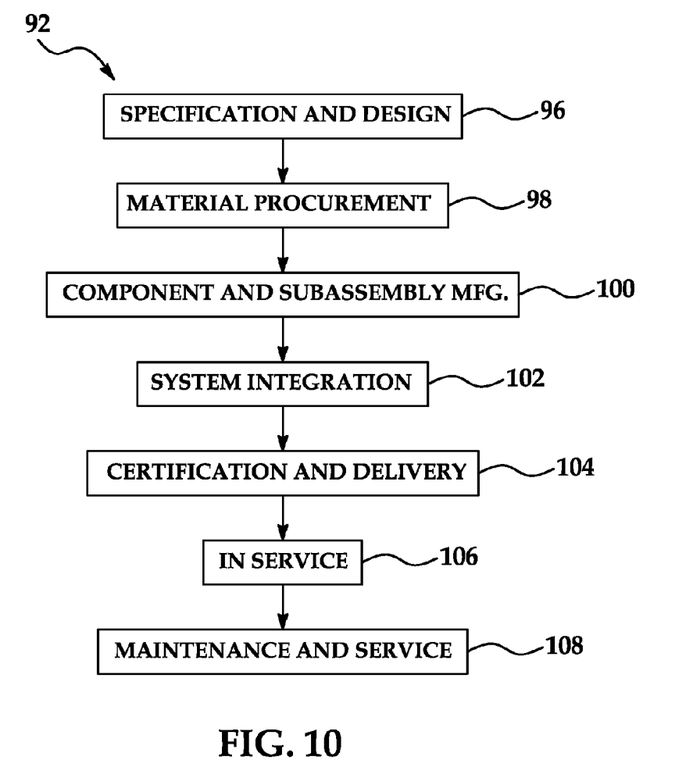
FIG. 10 is an illustration of a flow diagram of aircraft production and service methodology.
Figure 11:
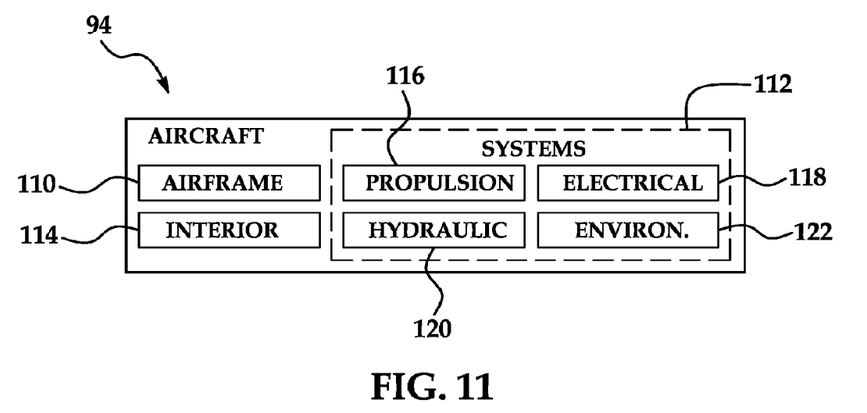
FIG. 11 is an illustration of a block diagram of an aircraft.

Referring next to FIGS. 10 and 11, embodiments of the disclosure may be used in the context of an aircraft manufacturing and service method 92 as shown in FIG. 10 and an aircraft 94 as shown in FIG. 11. During pre-production, exemplary method 92 may include specification and design 96 of the aircraft 94 and material procurement 98. During production, component and subassembly manufacturing 100 and system integration 102 of the aircraft 94 takes place. During step 100, the disclosed method and apparatus may be employed to fabricate composite parts such as fuselage sections which are then assembled at step 102. Thereafter, the aircraft 94 may go through certification and delivery 104 in order to be placed in service 106. While in service by a customer, the aircraft 94 may be scheduled for routine maintenance and service 108 (which may also include modification, reconfiguration, refurbishment, and so on).

Each of the processes of method 92 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 94 produced by exemplary method 92 may include an airframe 110 with a plurality of systems 112 and an interior 114. The disclosed method and apparatus may be employed to fabricate fuselage sections which form part of the airframe 110. Examples of high-level systems 112 include one or more of a propulsion system 116, an electrical system 118, a hydraulic system 120 and an environmental system 122. Any number of other systems may be included. Although an aerospace example is shown, the principles of the invention may be applied to other industries, such as the automotive industry.

The apparatus embodied herein may be employed during any one or more of the stages of the production and service method 92. For example, components or subassemblies corresponding to production process 100 may be fabricated or manufactured in a manner similar to components or subassemblies produced while the aircraft 132 is in service. Also, one or more apparatus embodiments may be utilized during the production stages 100 and 102, for example, by substantially expediting assembly of or reducing the cost of an aircraft 942. Similarly, one or more apparatus embodiments may be utilized while the aircraft 94 is in service, for example and without limitation, to maintenance and service 108.

Although the embodiments of this disclosure have been described with respect to certain exemplary embodiments, it is to be understood that the specific embodiments are for purposes of illustration and not limitation, as other variations will occur to those of skill in the art.

What is claimed:

1. A resin infusion apparatus for fabricating resin infused composite parts, comprising:
   a caul sheet having perforations therein for controlling the flow of resin through a component during resin infusion, the caul sheet comprising:
      a first region with a first plurality of perforations having a first density of perforations and a first resin permeability; and
      a second region with a second plurality of perforations having a second density of perforations different from the first density of perforations and a second resin permeability different from the first resin permeability such that resin flow through the first region differs from resin flow through the second region;
   a vacuum bag covering the caul sheet and the component; and
   a resin inlet passing through the bag and located over the caul sheet for supplying resin.

2. The apparatus of claim 1, wherein the perforations have a tapered cross section.

3. The apparatus of claim 1, wherein the perforations are non-uniformly located over the area of the caul sheet.

4. The apparatus of claim 1, wherein the caul sheet is generally rigid.

5. The apparatus of claim 1, wherein the density of the perforations is greater in some areas of the caul sheet than in other areas of the caul sheet.

6. The apparatus of claim 1, wherein the size of some of the perforations is greater than other of the perforations.

7. The apparatus of claim 1, further comprising:
   resin distribution media covering the caul sheet for distributing resin over the caul sheet.

8. The apparatus of claim 1, further comprising:
   a peel ply between the component and the caul sheet.

9. An apparatus for fabricating resin infused composite parts, comprising:
   a tool adapted to have a component placed thereon;
   a generally rigid caul sheet covering the component, the caul sheet having perforations therein based on a desired distribution of resin flow through the caul sheet and into the component, the caul sheet comprising a first region with a first plurality of perforations having a first density of perforations and a second region with a second plurality of perforations having a second density of perforations different from the first density of perforations;
   a peel ply between the component and the caul sheet;
   resin distribution media covering the caul sheet;
   a vacuum bag sealed to the tool and covering the combination of the component, the peel ply, the caul sheet and the resin distribution media;
   a source of resin;
   a resin inlet passing through the bag and generally centrally located over the caul sheet for supplying resin from the resin supply; and
   a resin outlet passing through the bag.

* * * * *